United States Patent
Schmidt et al.

(10) Patent No.: US 9,930,413 B2
(45) Date of Patent: Mar. 27, 2018

(54) PRESENTING MEDIA CONTENT FROM MULTIPLE, DISTINCT MEDIA CONTENT SOURCES

(71) Applicant: Verizon Patent and Licensing Inc., Arlington, VA (US)

(72) Inventors: Johannes P. Schmidt, Los Altos Hills, CA (US); Punitma Malhotra, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/056,463

(22) Filed: Feb. 29, 2016

(65) Prior Publication Data
US 2017/0251267 A1    Aug. 31, 2017

(51) Int. Cl.
H04N 21/482 (2011.01)
H04N 21/4147 (2011.01)
H04N 21/47 (2011.01)
H04N 21/472 (2011.01)
H04N 21/432 (2011.01)
H04N 21/438 (2011.01)
H04N 21/462 (2011.01)

(52) U.S. Cl.
CPC ... *H04N 21/47217* (2013.01); *H04N 21/4147* (2013.01); *H04N 21/4325* (2013.01); *H04N 21/4384* (2013.01); *H04N 21/4622* (2013.01); *H04N 21/47208* (2013.01); *H04N 21/482* (2013.01)

(58) Field of Classification Search
CPC ........... H04N 21/4622; H04N 21/2402; H04N 21/2662; H04N 21/64769; H04N 21/2387; H04N 21/251; H04N 21/252; H04N 21/25891; H04N 21/4325; H04N 21/4334; H04N 21/44222; H04N 21/47202; H04N 21/4756; H04N 21/6408; H04N 21/6582; H04N 21/482; H04N 21/4384; H04N 21/47208
See application file for complete search history.

(56) References Cited

U.S. PATENT DOCUMENTS

| | | | |
|---|---|---|---|
| 2002/0184639 A1* | 12/2002 | Frost | H04N 7/17318 725/89 |
| 2007/0009235 A1* | 1/2007 | Walters | H04N 21/6581 386/278 |
| 2014/0331260 A1* | 11/2014 | Gratton | H04N 21/4312 725/40 |

* cited by examiner

*Primary Examiner* — Pankaj Kumar
*Assistant Examiner* — Alazar Tilahun

(57) ABSTRACT

Techniques described herein may be used to provide a media program (e.g., a television program, a sporting event, a movie, advertisement, etc.) to a user by obtaining portions of the media program from multiple, distinct media content sources. A client device, such as a set-top-box (STB), may receive present an ongoing media program to a user. The user may request for the client device to start the media program from the beginning, rewind the media program, or otherwise access a previous portion of the media program. Depending on the request, the client device may obtain different portions of the media program requested by the user from multiple, distinct media content sources. Examples of such sources may include a buffer of the client device, a digital-video-recording (DVR) component of the client device, a DVR server, a catch up server, and a video-on-demand (VoD) server.

20 Claims, 11 Drawing Sheets

400 →

| Prioritized media content sources | |
|---|---|
| 1 | Buffer of client device |
| 2 | DVR service |
| 3 | Catch up service |
| 4 | VoD service |
| ... | ... |

Fig. 4

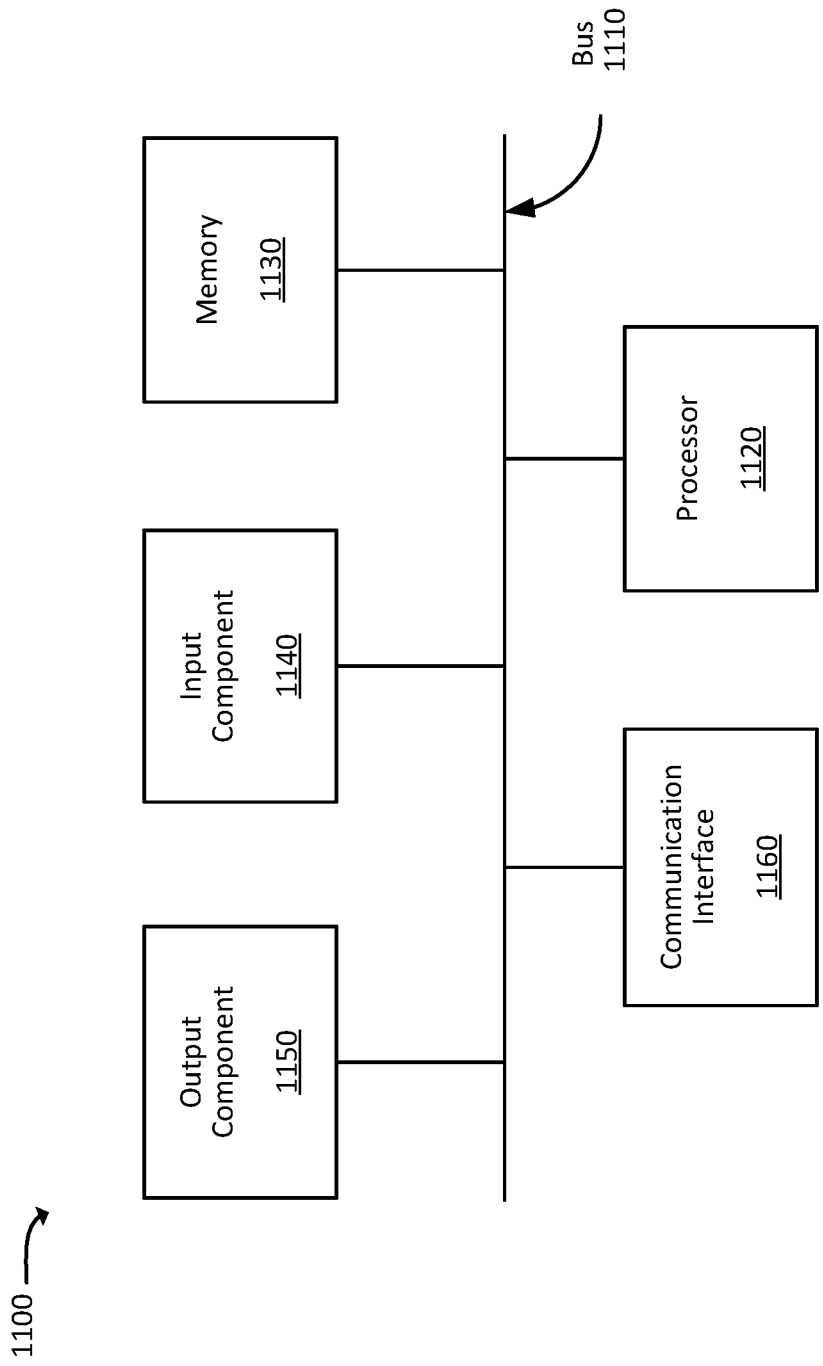

PRESENTING MEDIA CONTENT FROM MULTIPLE, DISTINCT MEDIA CONTENT SOURCES

BACKGROUND

Media programs (e.g., television shows, televised sporting events, movies, etc.) are often made available to users via a client device, such as a set-top-box (STB), a laptop computer, a smartphone, etc. For example, a STB may communicate with a content server to determine what types of media programs (e.g., televisions shows, movies, sporting events, etc.) are available for viewing. The STB may present a list of the available media programs to a user, via a television or another display device. The user may select the media program that he or she would like to watch, and the STB may present the selected media program to the user.

Additionally, media programs may be recorded and/or provided to users in one or more ways. For example, a STB may automatically record media content of whatever channel is selected by the user. The recorded media may be temporarily stored in a buffer of the STB. When the buffer is full, the STB may delete the older portions of the recorded media content in order to record the more recent portions of the media content. In some implementations, the STB may include digital video recorder (DVR) capabilities that may be used to record a media program that is broadcasted on a particular channel and at a particular time. In some implementations, the STB may also be capable of accessing a video on demand (VoD) service capable of streaming television programs, movies, and other media programs to the STB at the request of a user.

BRIEF DESCRIPTION OF THE DRAWINGS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

FIG. 4 is a block diagram of an example data structure for prioritizing media content sources;

FIG. 11 is a diagram of example components of a device.

DETAILED DESCRIPTION OF PREFERRED EMBODIMENTS

Figure 1A:
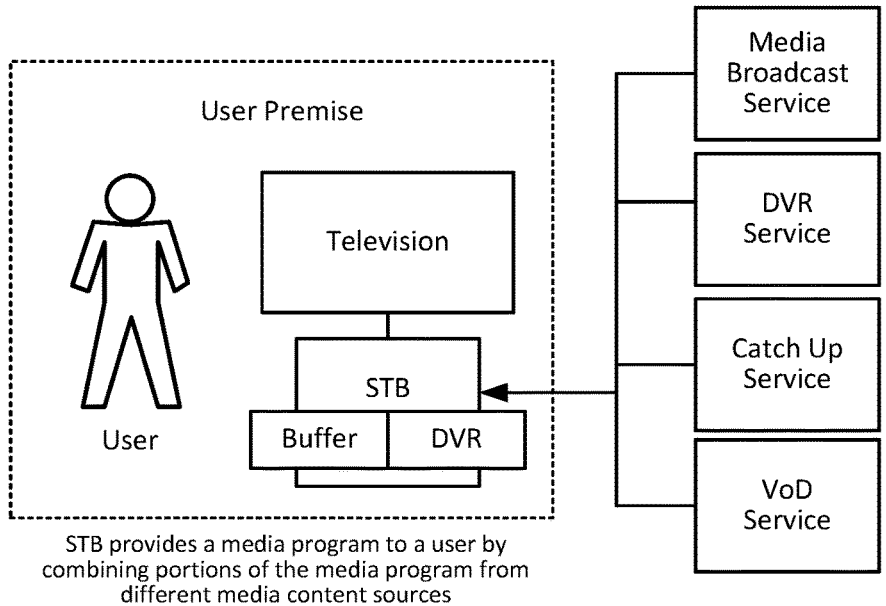
FIGS. 1A and 1B illustrate an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments defined by the appended claims and their equivalents.

Techniques described herein may be used to provide a media program (e.g., a television program, a sporting event, a movie, advertisement, etc.) to a user by obtaining portions of the media program from multiple, distinct media content sources. For example, a user may turn on a television connected to a client device (such as a set-top box (STB)) and notice an ongoing media program that he or she would like to watch. The user may request that the STB rewind the media program to a particular point in the media program or start the media program over.

Depending on the request from the user, the STB may identify appropriate media content sources for providing the requested media program (or portion thereof) to the user. For instance, the STB may be designed to automatically record the media content of whatever channel the STB is currently set to and to temporarily store the recorded media content in a local buffer (which may have a limited capacity of, for example, one hour of media content). As such, when the STB is currently set to the channel providing the media program requested by the user, the STB may access some of the media program from the buffer of the STB. If the STB includes digital video recording (DVR) capabilities that have been recording the media program, the STB may also, or alternatively, access portions of the requested media program via the DVR capabilities of the STB. The STB may also access portions of the requested media program from external sources, such as an external DVR server, a specialized server designed to record the media content from some or all channels (also referred to herein as a "catch up server"), and/or a video-on-demand (VoD) server. As such, the STB may provide the media program to the user by obtaining portions of the media program from multiple, distinct media content sources For example, if the user causes the STB to rewind the media program that is currently being shown on a particular channel, the STB may rewind the media program based on the media content stored in the buffer of the STB. If the user continues to rewind the media program beyond what is stored in the buffer, the STB may begin accessing such portions of the media program from other media content sources, such as a local DVR component of the STB, an external DVR server, a catch up server, or a VoD server. The media content source used by the STB may be based on one or more factors, such as a preselected preference for one type of media content source over another type of media content source, whether the requested media program is available from a particular media content source, how much of the requested media program is available from a particular media content source, etc. Accordingly, the STB may dynamically combine portions of the media program from multiple media content sources in order to provide the media program (or portion thereof) requested by the user.

Figure 1B:
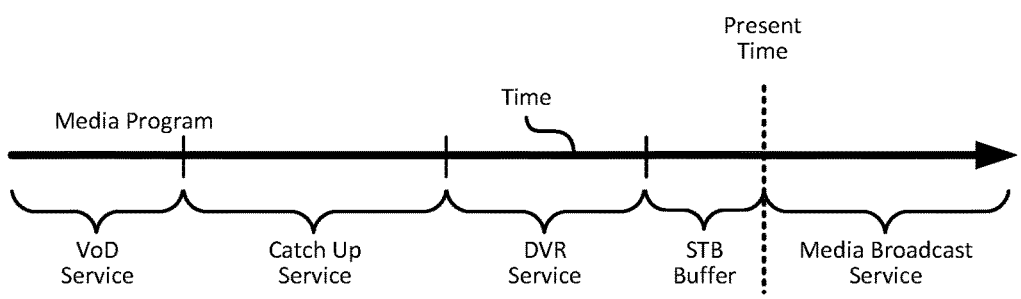

FIGS. 1A and 1B illustrate an example overview of an implementation described herein. As shown in FIG. 1A, a STB may receive a request from a user to present media content (or portion thereof) that is being communicated by a media broadcast service over a particular channel. As described herein, "media content" may refer to a media program (e.g., a television program, a sporting event, a movie, advertisement, etc.) or portion thereof. In some implementations, the request may include a request to view the media program from the beginning of the media program. In some implementations, the request may include a request to rewind a media program (e.g., from a point in the media program that is currently being communicated by the media broadcast service) to a particular point in the media program specified by the user, and/or to playback the media program from the point in the media program specified by the user.

In response to a request from the user, the STB may determine one or more sources for obtaining the media content. Examples of such sources may include a media broadcast service, a buffer of the STB, a local DVR component of the STB, an external DVR service, a catch up service, or a VoD service. The media broadcast service may include a media server used to provide (e.g., multicast) the media program at a scheduled time and via a particular channel. The buffer of the STB may include a portion of memory, of the STB, that is designated to automatically record whatever media content is currently being received by the STB. The local DVR component may include a capability of the STB to record a particular media program at a particular time and channel. The DVR service may include a service for recording certain media programs that are provided (e.g., by the media broadcast server) on specific dates, channels, and times. The catch up service may include a service that automatically records the media content for some or all channels that provide media programs. In some implementations, the catch up service may store the recorded programs for a preselected period of time (e.g., a week or two) before recording new media content. The VoD service may include a service that may provide complete media programs to the STB upon a request from the user. Accordingly, the STB may obtain media content from one or more of the media content sources depicted in FIG. 1A in order to provide media content requested by the user.

For example, referring now to FIG. 1B, assume that the STB is currently tuned to a channel that is showing a particular movie that the user would like to view from the beginning. As such, the STB may combine portions of the movie from the VoD service, the catch up service, the DVR service, the STB buffer, and the media broadcast service in order to display the entire movie to the user. For instance, the STB may display the beginning of the movie from the VoD service and subsequent portions of the movie from the catch up service, the DVR service, and the STB buffer. Once the movie being presented to the user coincides with a portion of the movie that is currently being provided by the media broadcast service, the STB may transition to the ongoing media content currently being provided by the media broadcast service. As such, the STB may provide a media program to a user by collecting portions of the media program from multiple, distinct media content sources.

Figure 2:
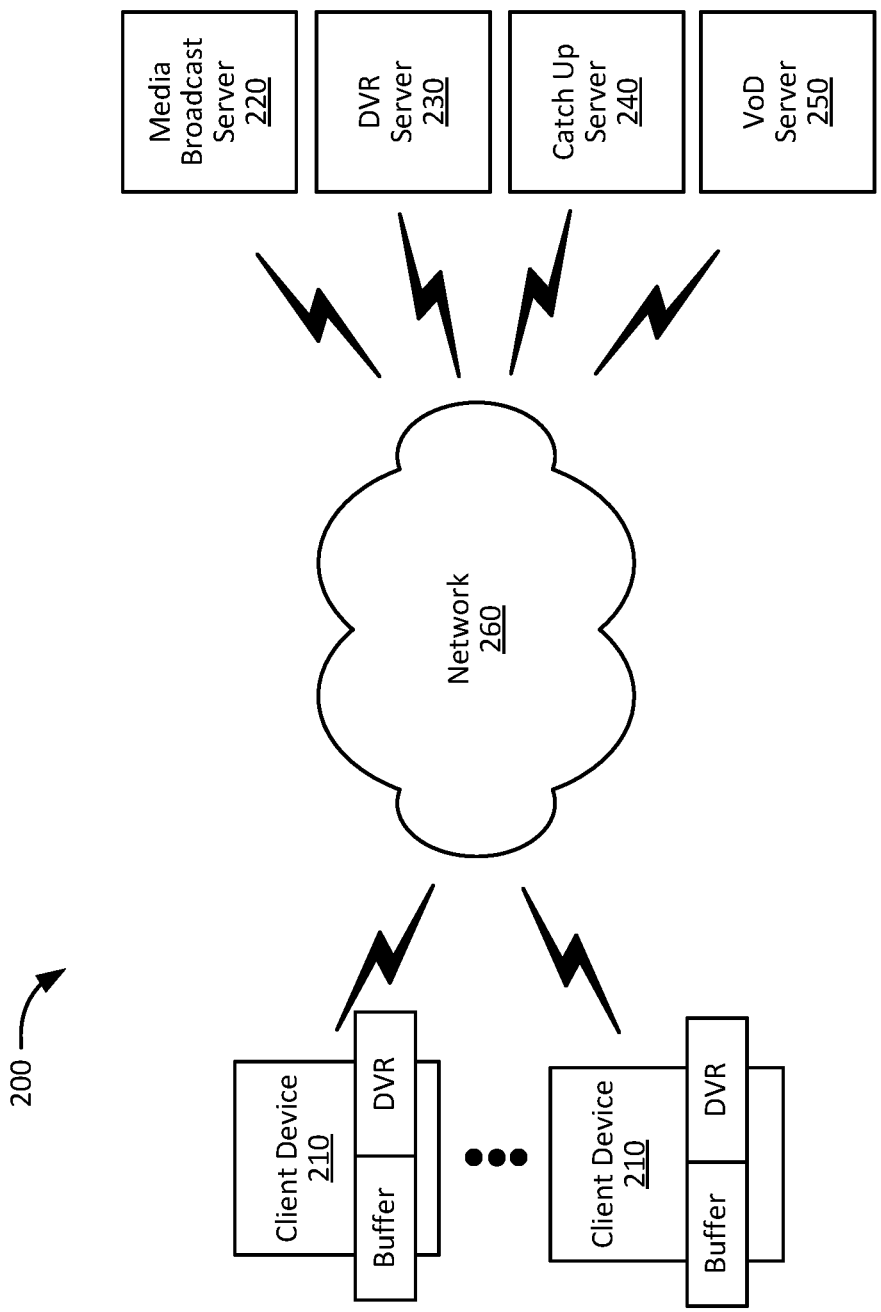
FIG. 2 is a diagram of an example environment in which systems and/or methods described herein may be implemented.

FIG. 2 is a diagram of an example environment 200 in which systems and/or methods described herein may be implemented. Environment 200 may include one or more client devices 210, media broadcast server 220, DVR server 230, catch up server 240, VoD server 250, and network 260.

Client device 210 may include a STB, a video game console, or a similar device, capable of communicating with one or more network devices via network 260. In some implementation, client device 210 may include a STB that is in communication with one or more television, monitors, or other types of user devices of a local network. Client device 210 may include a portable computing and communication device, such as a personal digital assistant (PDA), a smart phone, a cellular phone, a laptop computer with connectivity to a cellular wireless network, a tablet computer, etc. Client device 210 may also include a desktop computer, a consumer or business appliance, or another device that has the ability to connect to network 260. Client device 210 may also include a computing and communication device that may be worn by a user (also referred to as wearable devices) as a watch, a fitness band, a necklace, glasses, an eyeglass, a ring, a belt, a headset, or another type of wearable device.

Client device 210 may include a memory buffer for storing media content that is automatically recorded by client device 210. Additionally, or alternatively, client device 210 may include DVR capabilities that enable client device 210 to record a particular media program that is provided by media broadcast server 220 on a particular channel and at a particular time. Client device 210 may include a software program, which enables client device 210, to perform one or more of the operations described herein. For instance, client device 210 may present media content to a user by collecting portions of the media content from multiple, distinct media content sources (e.g., a buffer of client device 210, a DVR component of client device 210, media broadcast server 220, DVR server 230, catch up server 240, VoD server 250, etc.).

Media broadcast server 220 may include one or more computing devices, such as a server device or a collection of server devices associated with a content provider that may provide media content to client devices 210. In some implementations, media broadcast server 220 may be a web server that hosts webpages and/or content (e.g., videos, audio, etc.). Additionally, or alternatively, a link to content stored by media broadcast server 220 may be presented within an application or webpage associated with a web server or application server. In some implementations, media broadcast server 220 may provide the media content as part of a multicast communication. The multicast communication may include a multicast group or channel that client device 210 may join to receive the multicast. In some implementations, media broadcast server 220 may provide media content to client devices 210 via network 260, which may include a satellite broadcast network. In some implementations, media broadcast server 220 may be owned and/or operated by a broadcasting company or another organization, which may provide media content to client devices 210 over one or more channels.

DVR server 230 may include one or more computing devices, such as a server device or a collection of server devices, capable of recording particular media programs provided by media broadcast server 220. For example, DVR server 230 may receive a request from client device 210 to record a particular media program that will be provided, by media broadcast server 220, over a particular channel and at a particular time. In accordance with the request, DVR server 230 may record and store the media program.

DVR server 230 may also receive a request from client device 210 to playback the recorded media program (or only a portion thereof), and (in accordance with the request) DVR server 230 may provide the requested media content to client device 210. In some implementations, DVR server 230 may be capable of recording (and/or playing back) multiple media programs simultaneously. In some implementations, DVR server 230 may correspond to a media content service that is owned and/or operated by a network service provider of client devices 210. In some implementations, DVR server 230 may be implemented by a communication device that is local to client device 210 (e.g., as a network device in the home or office of a user of client device 210). In some implementations, one or more functionalities of DVR server 230, as described herein, may be incorporated into client device 210.

Catch up server 240 may include one or more computing devices, such as a server device or a collection of server devices, capable of recording media content from media broadcast server 220. For example, catch up server 240 may record the media content for some or all of the channels broadcasted by media broadcast server 220. In some implementations, catch up server 240 may store the recorded media content for a preselected period of time, such as one, two, or three weeks. Upon expiration of the preselected period of time, catch up server 240 may delete the recorded media content in order to, for example, make room for storing newly recorded media content. Catch up server 240 may also be capable of receiving a request from client device 210 for a particular media program, or portion thereof, and providing the requested media content to client device 210. In some implementations, catch up server 240 may correspond to a media content service that is owned and/or operated by a network service provider of client devices 210.

VoD server 250 may also include one or more computing devices, such as a server device or a collection of server devices, capable of providing media programs to client devices 210. For instance, VoD server 250 may store media programs that may be streamed to client device 210. Client device 210 may display a list of the media programs to a user, and the user may request that one of the media programs be played back via client device 210. In some implementations, some or all of the media content stored by VoD server 250 may correspond to the media content broadcasted by media content server 220. In some implementations, VoD server 250 may be capable of providing (e.g., streaming) an entire media program to client device 210. In some implementations, VoD server 250 may be capable of providing client device 210 with a portion of a media program (as specified by client device 210). In some implementations, VoD server 250 may correspond to a media content service that is owned and/or operated by a network service provider of client devices 210. In some implementations, VoD server 250 may be owned and/or operated by another organization.

Network 260 may include one or more wired and/or wireless networks. For example, network 240 may include a cellular network (e.g., a second generation (2G) network, a third generation (3G) network, a fourth generation (4G) network, a fifth generation (5G) network, a long-term evolution ("LTE") network, a global system for mobile ("GSM") network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In some implementations, network 260 may also, or alternatively, include a media broadcasting network, which may include a satellites, antennas, or other devices for broadcasting media content to client devices 210.

Figure 3:
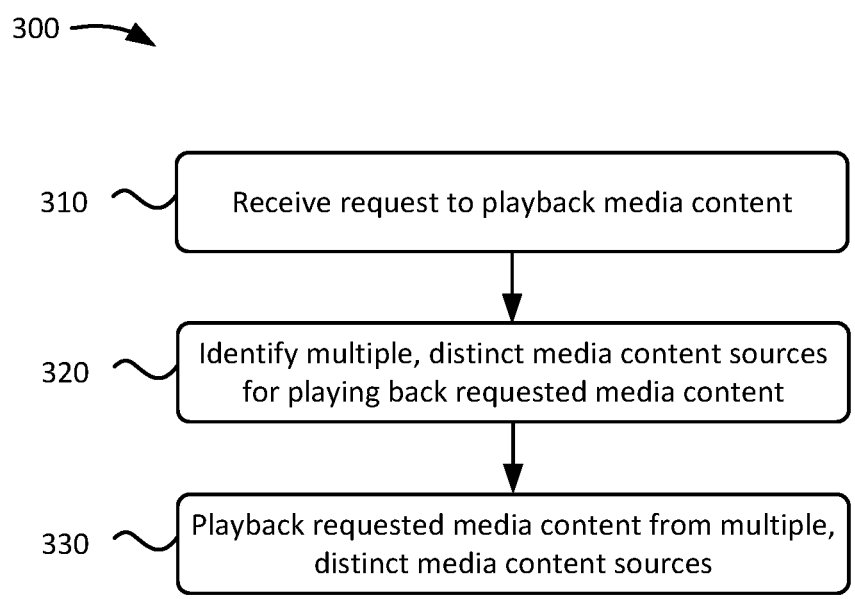
FIG. 3 is a flowchart diagram of an example process for providing a media program to a user by obtaining portions of the media program from multiple, distinct media content sources.

FIG. 3 is a flowchart diagram of an example process 300 for providing a media program to a user by obtaining portions of the media program from multiple, distinct media content sources. In some implementations, process 300 may be implemented by client device 210.

As shown, process 300 may include receiving a request to playback media content (block 310). For instance, client device 210 may receive a request from a user to playback a particular media program (or portion thereof). In some implementations, the request may be to playback the media program from the beginning of the media program. In some implementations, the request may be to playback the media program starting from a particular point in time. In some implementations, media broadcasts server 220 may currently be providing (e.g., multicasting) the media program to client device 210. For instance, a user may turn on a television (or another type of display device) connected to client device 210 and notice a media program that the user would like to watch. As such, the user may provide client device 210 with a request to start playing back the media program from the beginning of the media program. Alternative, the user may provide client device 210 with a request to begin rewinding the media program.

Process 300 may also include identifying multiple, distinct media content sources for playing back the requested media content (block 320). For example, client device 210 may identify the media content being requested by the user. The media content may be defined as the entire media program or a portion of the media program. For example, if the user has requested that the media program be played back from the beginning, client device 210 may identify the media content being requested as a portion of the media program that extends from the beginning of the media program to the portion of the media program that is currently being provided by media broadcast server 220. By contrast, if the user has requested that client device 210 rewind the media program being provided by media broadcast server 220, then client device may identify the media content being requested as a portion of the media program immediately preceding the portion of the media program being provided by media broadcast server 220.

For example, client device 210 may determine that a user has requested that a three-hour movie be played back in its entirety. In another example, client device 210 may determine that the user has requested that only the last two hours of the three-hour movie be played back by client device 210. In another example, client device 210 may determine the amount of media content requested, by the user, based on how much the user has caused client device 210 to rewind an ongoing media program.

Additionally, client device 210 may determine how much of the media content, requested by the user, may be played back from each media content source. For instance, assume that the user has requested that client device 210 playback the last two hours of a three-hour movie. In such a scenario, client device 210 may determine that the first hour may be played back from a DVR server 230 and the second hour may be played back from the buffer of client device 210.

In some implementations, prior to playing back the media content requested by the user, client device 210 may identify each media content source that will provide portions of the media content to client device 210. For example, if client device 210 receives a request from a user to restart an ongoing media program from the beginning, client device 210 may identify all the media content sources that will be involved in providing the requested media content to the user.

Additionally, or alternatively, client device 210 may identify media content sources on an "as needed" basis. For example, if the user requests that client device 210 begin rewinding a media program that is currently being received, client device 210 may identify the buffer of client device 210 as the media content source for accessing the media content pertaining to the user's request. Additionally, if the user continues to rewind the media program such that the media content in the buffer will soon be exhausted, client device 210 may identify another media content source in case the user actually does rewind the media program beyond what is stored in the buffer. For example, client device 210 may identify DVR server 230 as a subsequent source media content from the media program being rewound by the user. As such, client device 210 may identify media content sources at different times and in different ways.

FIG. 4 is a block diagram of an example data structure 400 for prioritizing media content sources. As shown, data structure 400 may include a list of media content sources, ranging from the media content source of the highest priority to the media content source of the lowest priority. Client device 210 may use data structure 400 to identify media content sources for playing back a particular media program requested by a user. For instance, in response to receiving a request from the user to playback a particular media program, client device 210 may first determine whether the media program (or a portion of the media program requested by the user) may be played back from the buffer of client device 210.

If so, client device 210 may playback the media program from the buffer. If not from the buffer, client device 210 may then determine if the media program (or a portion of the media program requested by the user) may be played back by a DVR service (e.g., DVR server 230). If so, client device 210 may playback the media program from the DVR service. If not, client device 210 may take similar actions with respect to playing back the media program from a catch up service (e.g., catch up server 240), a VoD service (e.g., VoD server 250), and/or another media content source identified in data structure 400. As such, client device 210 may have a preference for receiving media content from certain types of media content sources.

Returning to FIG. 3, process 300 may include playing back the requested media content from the multiple, distinct media content sources. For instance, client device 210 may present the media content, requested by the user from, the media content sources identified (by client device 210) in response to the request from the user to playback the media content. As such, client device 210 may playback media content from a local buffer if client device 210 and/or stream the media content from a DVR server 230, catch up server 240, or VoD server 250. As mentioned above, in some implementations, client device 210 may also have DVR capabilities, such that a portion of the media program may be played back from a storage component of client device 210.

In some implementations, client device 210 may switch from one media content source to another media content source based on a frame number, a program timestamp, or another identifier associated with the media content. For example, a client device 210 may transition from playing back media content from the buffer of client device 210 to playing back the media program from DVR server 230 by determining an identifier corresponding to the last frame stored by the buffer and providing the identifier to DVR server 230, along with instructions to provide client device 210 with the media program starting from the next frame. In another example, client device 210 may identify a timestamp of the last frame from one media content source and provide the timestamp to another media content source, along with instructions to begin providing a portion of the media program beginning from the timestamp provided.

Figure 5:
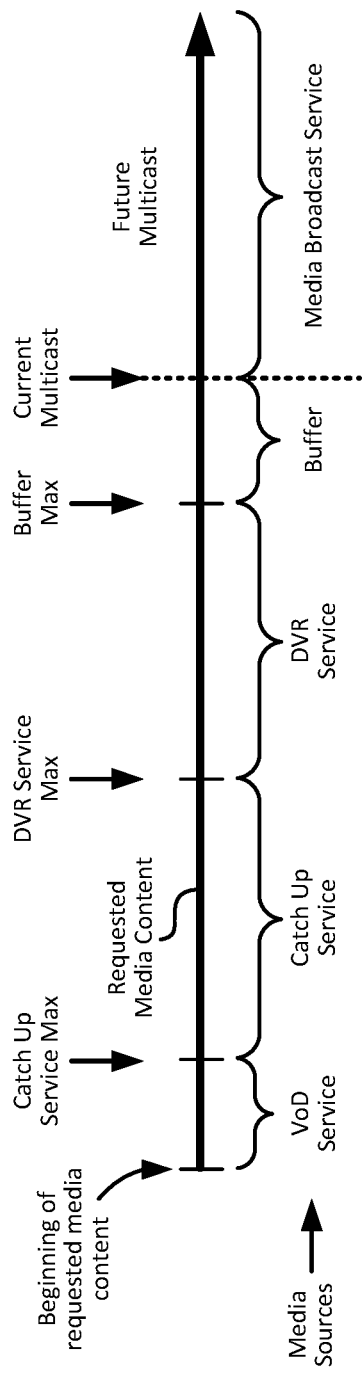
FIG. 5 is a diagram of an example of providing a media program to a user by obtaining portions of the media program from multiple, distinct media content sources.

FIG. 5 is a diagram of an example of providing a media program to a user by obtaining portions of the media program from multiple, distinct media content sources. In some implementations, the example of FIG. 5 may be implemented by client device 210.

For example, client device 210 may receive a request from a user to playback media content corresponding to a particular media program or portion thereof. In response to the request, client device 210 may identify multiple, distinct media sources for playing back the requested media content. In some implementations, this may include client device 210 mapping the requested media content to media content sources, such as a VoD service, a catch up service, a DVR service, a buffer, and a media broadcast service. In some implementations, mapping the requested media content to the media content sources may include identifying an amount of the requested media content that may be played back from each media content source. For instance, client device may determine a maximum amount of the requested media content that may be played back from each media content source.

Additionally, as described above, client device 210 may map the requested media content to media content sources in accordance with a preselected priority of media content sources. As such, the example of FIG. 5 may include a scenario where a maximum amount of the requested media content is provided from the buffer of client device 210, followed by a maximum amount of the requested media content being provided by the DVR service, a maximum amount of the requested media content being provided by the catch up service, and finally the VoD service. Additionally, if and when the presentation of the requested media content catches up to a current multicast (e.g., from media broadcast server 220), client device 210 may automatically switch to the media broadcast service as the source of the requested media content.

Figure 6:
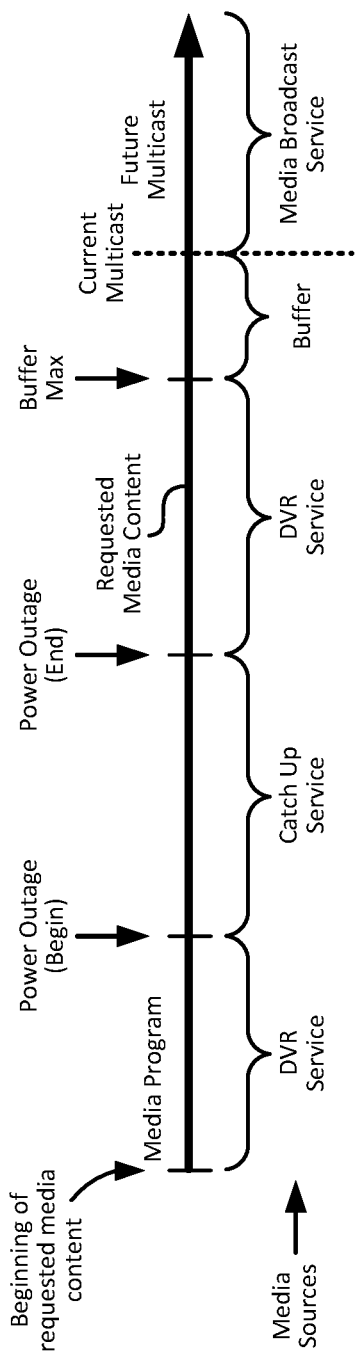
FIG. 6 is a diagram of another example of providing a media program to a user by obtaining portions of the media program from multiple, distinct media content sources.

FIG. 6 is a diagram of another example of providing a media program to a user by obtaining portions of the media program from multiple, distinct media content sources. In some implementations, the example of FIG. 6 may be implemented by client device 210.

As shown, the example of FIG. 6 may include a scenario where a power outage has occurred while media content was being recorded by a DVR service. For example, assume that a user has requested that the media content represented in FIG. 6 be played back by client device 210. In response to the request, client device 210 may identify media content sources for playing back the media content requested by the user. Assume also that client device 210 includes a priority of media content sources, such that the buffer of client device 210 is the media content source of the highest priority, followed by a DVR service, a catch up service, and a VoD service. As such, client device 210 may map the media content requested by the user to sources of media content.

For example, the memory buffer may be used to playback the most recently recorded media content, followed by media content recorded by the DVR service. However, as shown in FIG. 6, while the media content was being recorded by the DVR service, a power outage occurred, such that there is a gap in the media content recorded by the DVR service. As such, client device 210 may identify alternative media content sources (e.g., catch up service and VoD service) for filling the gap in the media content recorded by the DVR service. As such, when playing back the media content requested by the user, client device 210 may begin with the media content recorded by the DVR service. Once the gap in the media content recorded by the DVR service is reached, client device 210 may playback the requested media content from an alternative media content source such as a catch up service.

Additionally, since the DVR service is prioritized above the catch up service for playback purposes, client device 210 may switch back to the DVR service once the gap in the media content recorded by the DVR service has been filled by media content from the catch up service. Similarly, since the buffer may be prioritized above the DVR service, client device 210 may switch to the buffer once the buffer includes the media content that the user has requested be played back. In a similar manner, client device 210 may switch to a current multicast of the media content if and when the playing back of the requested media content catches up with media content that is currently being provided by media broadcast server 220.

Figure 7A:
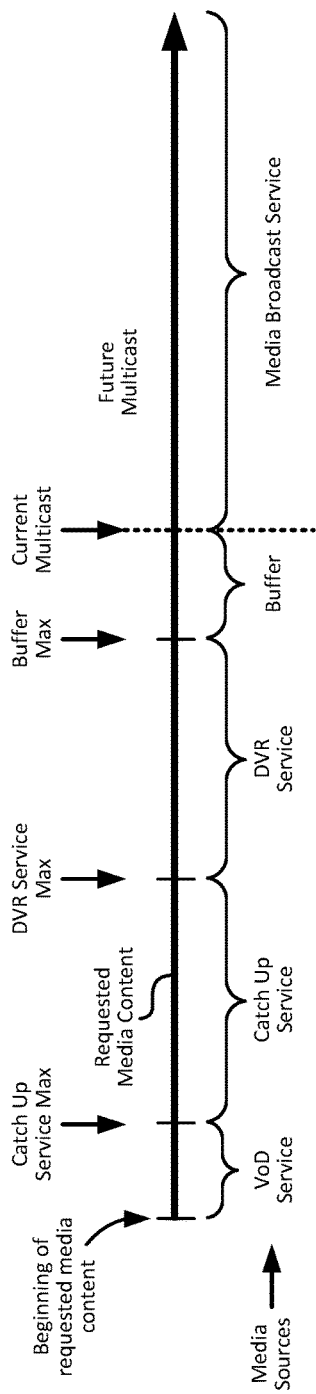
FIGS. 7A and 7B are diagrams of another example of providing a media program to a user by obtaining portions of the media program from multiple, distinct media content sources.
Figure 7B:
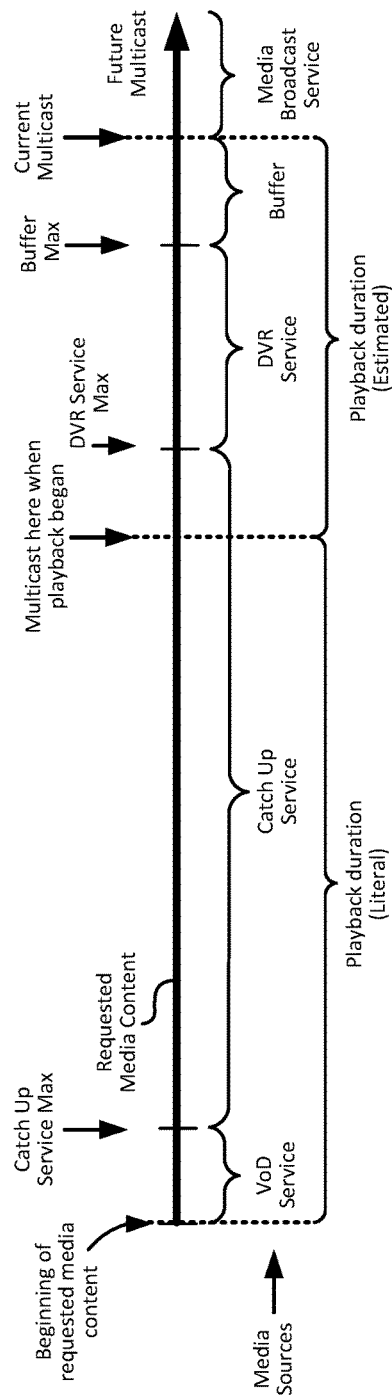

FIGS. 7A and 7B are diagrams of another example of providing a media program to a user by obtaining portions of the media program from multiple, distinct media content sources. In some implementations, the example of FIG. 7 may be implemented by client device 210.

As shown, the example of FIGS. 7A and 7B may include a scenario where client device 210 may dynamically adjust media content sources based on the amount of time it takes to playback the media content requested by the user. For example, FIG. 7A may represent client device 210 mapping the media content requested by the user to media content sources, which include a buffer of client device 210, a DVR service, a catch up service, and a VoD service. However, while client device 210 plays back the requested media content, the media broadcast service may continue to provide media content corresponding to the media program that the user would like to see. As such, the portion of the media program being provided by media broadcast server 220 when the user requests playback may be different than the portion of the media program being provided when the playback has caught up with the current multicast of the media program.

Additionally, assume that the buffer of client device 210 is full at the time the media content is requested by the user. Since client device 210 may record newly provided media content automatically, the oldest media content stored in the buffer may be removed to make room for the newly recorded media content. Consequently, the media content in the buffer at the time playback is requested by the user may be different than the media content in the buffer at the time the playback catches up with current multicast of the media program. As such, client device 210 may account for such a change in media content and media content sources.

In some implementations, client device 210 may estimate the amount of time that will be required to playback the media content requested by the user and adjust the mapping of the media content and the media content sources accordingly. In some implementations, the estimated playback duration may be equal to the literal duration of media content requested by the user (e.g., the total time required to playback the requested media content at normal speed, without fast forwarding through content, skipping content, etc.). In other implementations, the estimated playback duration may be different than the duration of the requested media content. For instance, if the requested media content includes a media program that is periodically interrupted by advertisements, client device 210 may assume that the client will fast forward (or otherwise skip) the advertisements, such that the estimated playback duration of the media content may be less than the literal playback duration of the media content. As another example, the estimated playback time may be different from the literal playback time when the requested media content includes an overture, an intermission, a sporting event with a half-time show, etc.

Accordingly, the estimated playback duration for the media content of FIG. 7B may be less than the literal playback duration of the requested media content. Additionally, as client device 210 plays back the requested media content, client device 210 may periodically remap the requested media content to the media content sources in order to ensure that the requested media content may be presented to the user in a seamless manner. In some implementations, client device 210 may monitor the viewing behavior of the user in order to provide a more accurate estimate. For instance, client device 210 may verify whether the user tends to fast forward through advertisements and estimate the remaining playback duration accordingly. In some implementations, client device 210 may remap the requested media content to the media content sources according to a preselected schedule (e.g., every 2 minutes of playback time). In some implementations, client device 210 may do so in response to a preselected trigger, such as the user fast forwarding through any of the media content, through portions of the media content that client device 210 did not anticipate (e.g., portions of the actual sporting event (as opposed to merely the advertisements)), pausing the playback of the media content, etc. Accordingly, client device 210 may dynamically adjust media content sources while the requested media program is being played back to the user.

Figure 8A:
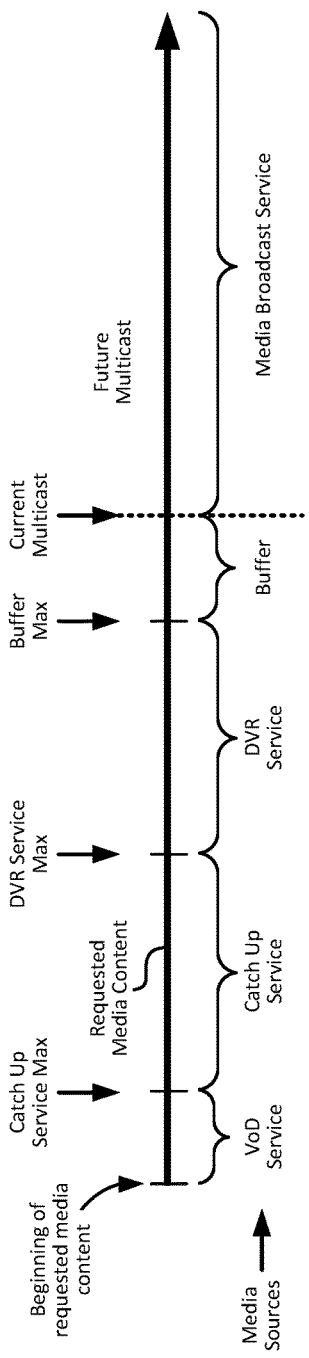
FIGS. 8A and 8B are diagrams of another example of providing a media program to a user by obtaining portions of the media program from multiple, distinct media content sources.
Figure 8B:
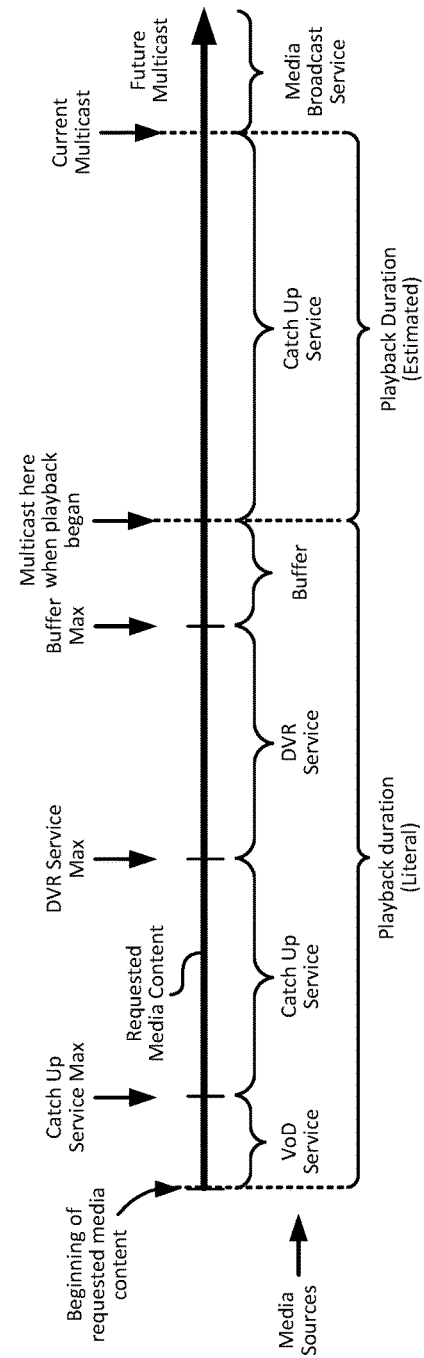

FIGS. 8A and 8B are diagrams of another example of providing a media program to a user by obtaining portions of the media program from multiple, distinct media content sources. In some implementations, the example of FIG. 8 may be implemented by client device 210.

FIGS. 8A and 8B are similar to FIGS. 7A and 7B in that FIGS. 8A and 8B may provide an example of client device 210 accounting for playback duration when mapping requested media content to media content sources. However, FIGS. 8A and 8B provide an alternative to adjusting multiple media content sources in order to account for playback duration. For instance, FIG. 8A may include an example of an initial mapping of media content requested by a user to media content sources, and as shown in FIG. 8B, client device 210 may account for the estimated playback duration by: 1) maintaining the initial mapping of media content and media content sources; and 2) mapping the media content corresponding to the estimated playback duration to a particular media content source. In contrast to the example of FIGS. 7A and 7B, in the example of FIGS. 8A and 8B, the media content stored by the buffer of client device 210 and by the DVR service may be static (as opposed to dynamic) while the media content is being played back by client device 210. Accordingly, client device 210 may implement various techniques when determining media content sources that may be used to playback a media program requested by a user.

Figure 9:
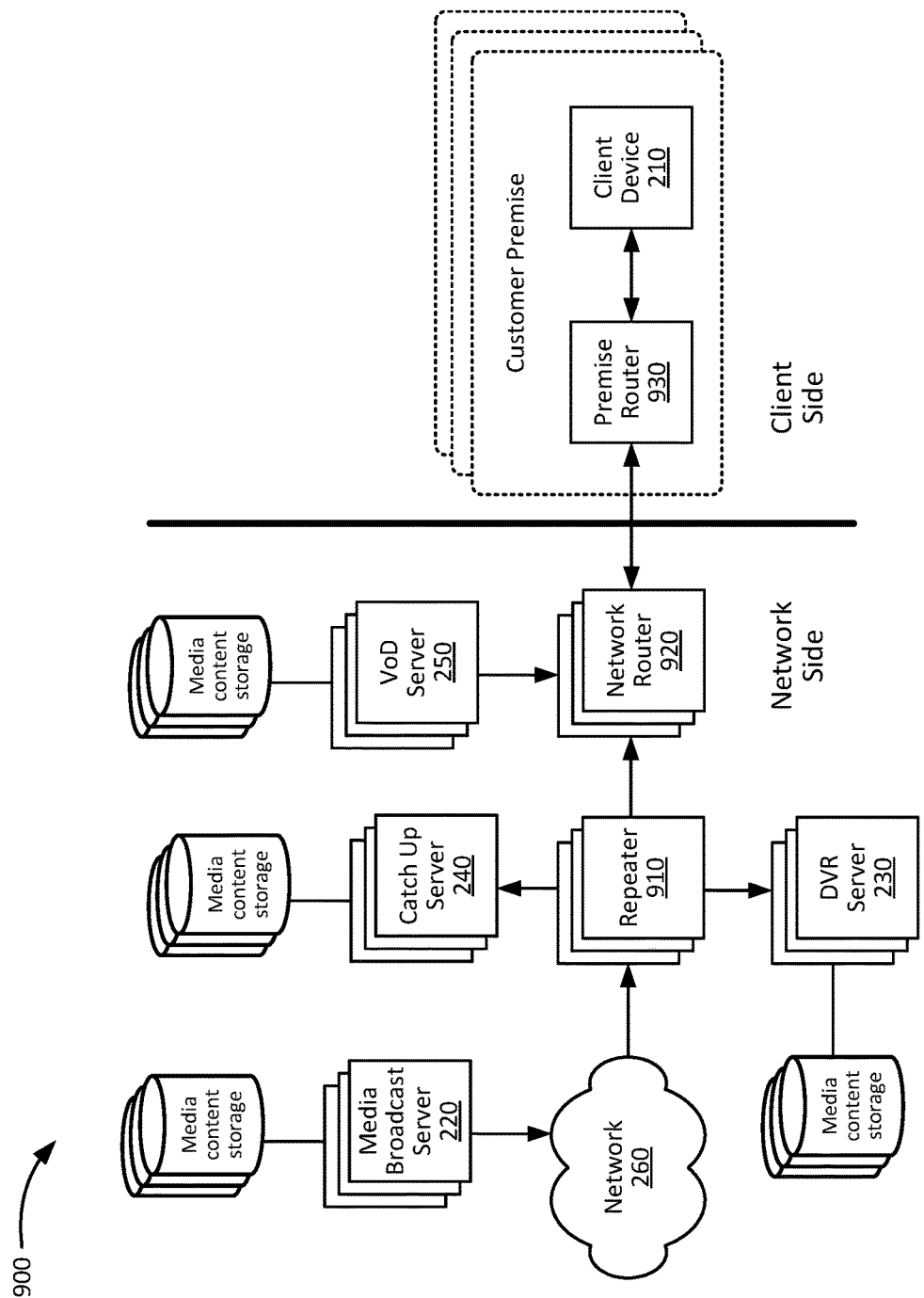
FIG. 9 is a block diagram of an example network for providing a media program to a user by obtaining portions of the media program from multiple, distinct media content sources.

FIG. 9 is a diagram of an example network 900 for providing a media program to a user by obtaining portions of the media program from multiple, distinct media content sources. As shown, network 900 may include client device 210, media broadcast server 220, DVR server 230, catch up server 240, VoD server 250, network 260, repeaters 910, network routers 920, and premise router 930. Examples of client device 210, media broadcast server 220, DVR server 230, catch up server 240, VoD server 250, and network 260 are discussed above with reference to FIG. 2. In some implementations, DVR server 230 may also, or alternatively, be implemented as a client-side device, such as one or more DVR devices located at the customer premise, as a component to client device 210, etc. In some implementations, network 900 may include additional, alternative, or fewer devices (and/or connections) than those depicted in FIG. 9.

Repeaters 910 may include one or more network devices capable of repeating media content that is provided by media broadcast server 220. As shown, repeaters 910 may communicate a copy of the media content to catch up server 240, DVR server 250, and network routers 920. Repeating the media content to catch up server 240 and DVR server 230 may enable catch up server 240 and DVR server 230 to record copies of media programs provided by media broadcast server 220. In some implementations, catch up server 240 may record all of the media content received from repeaters 910, whereas DVR server 230 may only record media content that has been selected (e.g., by a user) to be recorded. Additionally, the media content recorded by DVR server 230 may be associated with a particular client device 210 and/or user account, such that the recorded media content may only be available to the client device that requested that the media content be recorded.

In some implementations, the media content from media broadcast server 220 may be stored in media content storage devices connected to media broadcast server 220. Additionally, the media content recorded by catch up server 240 and/or DVR server 230 may be stored in media content storage devices connected to catch up server 240 and/or DVR server 230. The media content from media broadcast server 220 may not be forwarded to, or recorded by, VoD server 250. Instead, the media content stored by VoD server 250 may be independent (e.g., provided by another system or organization) from the media content originating from media broadcast server 220.

Network routers 920 may include one or more routers, gateways, or other network devices capable of communicating media content originating from media broadcast server 220 to the premise routers 930 of one or more customer premises. In some implementations, network routers 920 may be capable of implementing a multicast broadcast (toward certain client devices 210) of the media content from the media broadcast server 220. Premise router 930 may include a router installed at a home, business, or other customer location. Premise router 930 may be capable of receiving media content originating from media broadcast server 220 and relaying the media content to client device 210. Additionally, premises router 930 may be capable of relaying requests for media content from client device 210 to DVR server 230, catch up server 240, and/or VoD server 250. Premise router 930 may be capable of receiving media content originating from DVR server 230, catch up server 240, and/or VoD server 250 and relaying the media content to client device 210.

Figure 10:
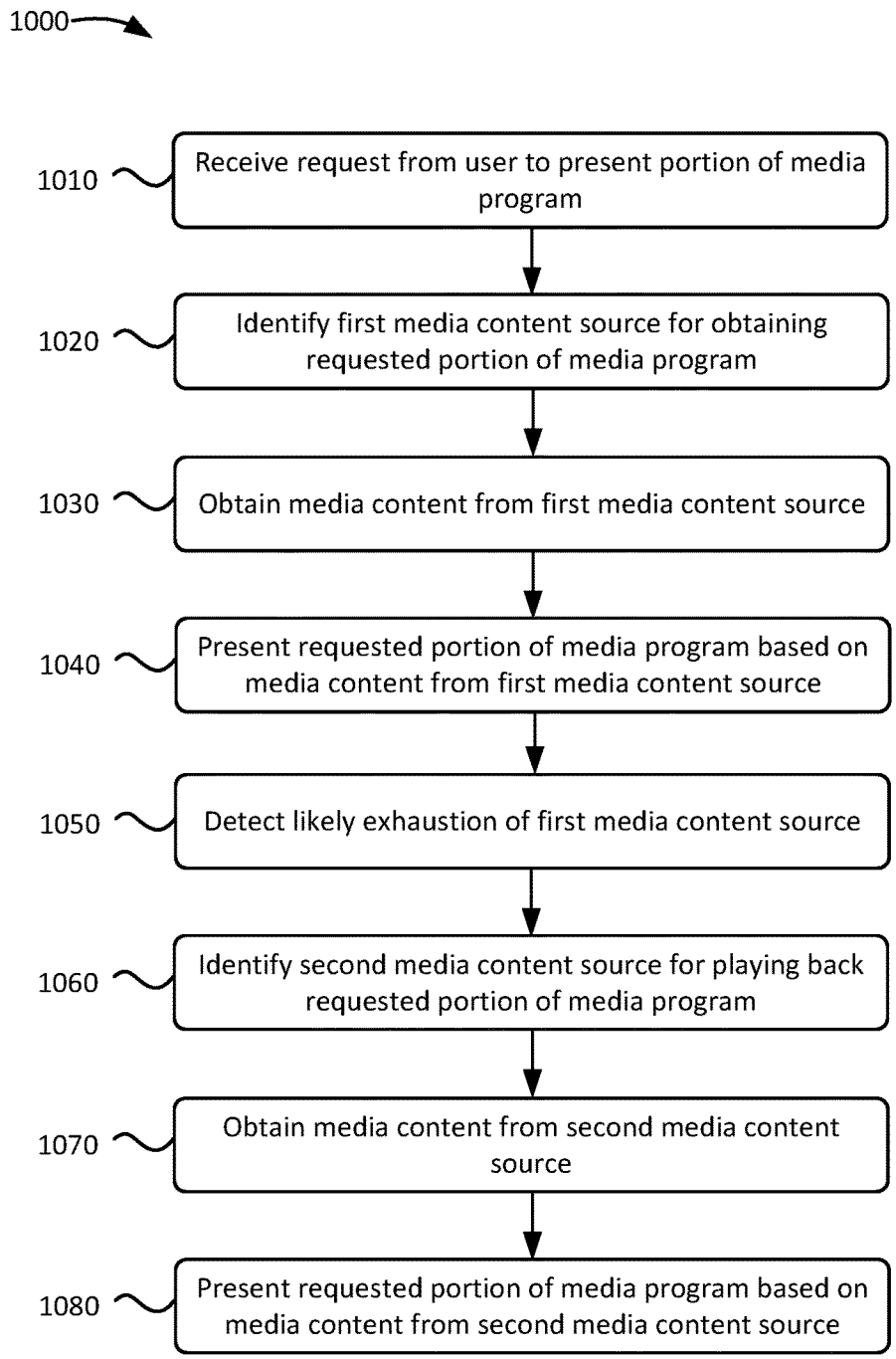
FIG. 10 is a flowchart diagram of an example process for providing a media program to a user by obtaining portions of the media program from multiple, distinct media content sources.

FIG. 10 is a flowchart diagram of an example process 1000 for providing a media program to a user by obtaining portions of the media program from multiple, distinct media content sources. In some implementations, process 1000 may be performed by client device 210.

As show, process 1000 may include receiving a request form a user to present a portion of a media program (block 1010). For example, client device 210 may receive a request from a user to view a particular media program or portion thereof. In some implementations, when the request is received, client device 210 may currently be receiving the media program from media broadcast server 220. In some implementations, the request may include a request for client device 210 to start the media program from the beginning of the media program. In some implementations, the request may include a request for client device 210 to rewind the media program.

Process 1000 may include identifying a first media content source for obtaining the requested portion of the media program (block 1020). For example, based on the type of request received from the user, client device 210 may identify a media content source that is appropriate for presenting the portion of the media program requested by the user. For example, if the request from the user is a request to begin rewinding the media program that is being received, client device 210 may identify the buffer of the client device 210 as the first media content source for obtaining the requested portion of the media program. The buffer may be an appropriate media content source since client device 210 may be automatically recording the media program. As a different example, if the request is for client device 210 to start the media program from the beginning, client device 210 may identify DVR server 230, catch up server 240, or VoD server 250 as the first media content source for obtaining the requested portion of the media program. In this example, DVR server 230, catch up server 240, or VoD server 250 may be an appropriate media content source since the buffer of client device 210 may only be capable of store a portion of the media program (e.g., the last half-hour, the last hour, etc.) which may not include the beginning of the media program.

Process 1000 may include obtaining media content from the first media content source (block 1030). For example, client device 210 may begin receiving media content, corresponding to the portion of the media program requested by the user, from the first media content source. In some implementations, the media content may be obtained from a local component, such the buffer or a DVR component of client device 210. In some implementations, the media content may be obtained from a remote device, such as DVR server 230, catch up server 240, or VoD server 250.

Process 1000 may include presenting the requested portion of the media program based on the media content from the first media content source (block 1040). For example, client device 210 may provide the media content, obtained from the first media content source, to the user. In some implementations, presenting the requested portion of the media program to the user may include displaying a visual portion of the media content on a television (or another display device) and/or causing an audio portion of the media content to e played through one or more speakers connected to client device 210.

Process 1000 may include detecting a likely exhaustion of the media content available from the first media content source (block 1050). For example, client device 210 may monitor an amount of media content, corresponding to the portion of the media program requested by the user, that is available via the first media content source. Additionally, client device 210 may determine whether it is likely that the media content available via the first media content source will be exhausted. For instance, if the amount of media content available via the first media content source is reduced to a preselected threshold (which may be measured in terms of remaining playback duration, a percentage of available media content, or using another unit of measurement), client device 210 may determine that the media content available via the first media content source will likely expire (e.g., additional media content corresponding to the media program may be required).

Process 1000 may include identifying a second media content source for obtaining the requested portion of the media program (block 1060). For example, when it appears that the media content available via the first media content source may not be adequate, client device 210 may identify another media content source that is appropriate for continuing to present the portion of the media program requested by the user. In some implementations, client device 210 may identify the second media content source based on one or more criteria, such as whether a prospective media content source has access to the appropriate media content, whether the media content is available from a media content source of a higher priority, etc.

Process 1000 may include obtaining media content from the second media content source (block 1070). For example, client device 210 may begin receiving media content, corresponding to the portion of the media program requested by the user, from the second media content source. In some implementations, the media content may be obtained from a local component, such the buffer or a DVR component of client device 210. In some implementations, the media content may be obtained from a remote device, such as DVR server 230, catch up server 240, or VoD server 250.

Process 1000 may include presenting the requested portion of the media program based on the media content from the second media content source (block 1080). For example, client device 210 may provide the media content, obtained from the second media content source, to the user. In some implementations, presenting the requested portion of the media program to the user may include providing the media content to the user in the same manner that the media content from the first media content source was provided to the user (e.g., a television, a speaker, etc.).

FIG. 11 is a diagram of example components of a device 1100. Each of the devices illustrated in FIGS. 1A, 2 and 9 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 3 and 10 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, performed by a client device, comprising:
  receiving, by the client device, a media program currently being provided to the client device from a media content server via a network to which the client device is connected;
  receiving, by the client device and from a user, a request to playback media content corresponding to the media program, the request to playback the media content including a request for the client device to begin rewinding the media program being provided to the client device;
  identifying, by the client device and based on how much of the media program is rewound, a plurality of distinct media content sources for obtaining different portions, of a plurality of portions, of the media content being provided from the media content server, the plurality of distinct media content sources including:
    a Digital Video Recorder (DVR) server that includes a first portion, of the plurality of portions, of the media content;
    a catch up server that includes the first portion and a second portion, of the plurality of portions, of the media content; and
    a video-on-demand (VoD) server that includes the first portion, the second portion, and a third portion, of the plurality of portions, of the media content;
  obtaining, by the client device via the network, the first portion from the DVR server, the second portion from the catch up server, and the third portion from the VoD server; and
  presenting, by the client device, the media content to the user.

2. The method of claim 1, wherein each media content source, of the plurality of distinct media content sources, corresponds to a different type of media content source.

3. The method of claim 2, wherein the first portion, the second portion, and the third portion, of the plurality of portions, of the media content are obtained from the DVR server, the catch up server, and the VoD server in accordance with a preselected priority of media content source types.

4. The method of claim 1, wherein:
  the identifying of the plurality of distinct media content sources includes:
    identifying a gap in a portion of the media content recorded by a particular media content source of the plurality of distinct media content sources, and
    identifying another media content source, of the plurality of distinct media content sources, capable of providing media content to fill the gap, and
  the obtaining of the different portions of the media content includes:
    obtaining the media content with the gap from the particular media content source, and
    obtaining the media content to fill the gap from the another media content source.

5. The method of claim 4, wherein the presenting of the media content to the user includes:
  combining the media content from the media content source with the media content from the another media content source to cohesively present the different portions of the media content to the user.

6. The method of claim 1, wherein each media content source, of the plurality of distinct media content sources, is sequentially identified, in accordance with the priority, as the media program is being rewound.

7. The method of claim 1, wherein:
  the plurality of distinct media content sources includes a local DVR capability of the client device,
  the client device is located at a user premises,
  the network is external to the user premises, and
  the DVR server is part of the network.

8. A client device, comprising:
  a non-transitory memory device storing a plurality of processor-executable instructions; and
    a processor configured to execute the processor-executable instructions, wherein executing the processor-executable instructions cause the processor to:
      receive a media program provided to the client device from a media content server via a network to which the client device is connected;
      receive, from a user, a request to playback media content corresponding to the media program, the request to playback the media content including a request for the client device to begin rewinding the media program being provided to the client device;
      identify, based on how much of the media program is rewound, a plurality of distinct media content sources for obtaining different portions, of a plurality of portions, of the media content provided from the media content server, the plurality of distinct media content sources including:

a Digital Video Recorder (DVR) server that includes a first portion, of the plurality of portions, of the media content;
a catch up server that includes the first portion and a second portion, of the plurality of portions, of the media content; and
a video-on-demand (VoD) server that includes the first portion, the second portion, and a third portion, of the plurality of portions, of the media content;
obtain, via the network, the first portion, the second portion, and the third portion, of the plurality of portions, of the media content from the DVR server, the catch up server, and the VoD server; and
present the media content to the user.

9. The client device of claim 8, wherein each media content source, of the plurality of distinct media content sources, corresponds to a different type of media content source.

10. The client device of claim 9, wherein the first portion, the second portion, and the third portion, of the plurality of portions, of the media content are obtained from the DVR server, the catch up server, and the VoD server in accordance with a preselected priority of media content source types.

11. The client device of claim 8, wherein:
to identify the plurality of distinct media content sources, the processor-executable instructions cause the processor to:
identify a gap in a portion of the media content recorded by a particular media content source of the plurality of distinct media content sources, and
identify another media content source, of the plurality of distinct media content sources, capable of providing media content to fill the gap, and
to obtain the different portions of the media content, the processor-executable instructions cause the processor to:
obtain the media content with the gap from the particular media content source, and
obtain the media content to fill the gap from the another media content source.

12. The client device of claim 11, wherein, to present the media content to the user, the processor-executable instructions cause the processor to:
combine the media content from the media content source with the media content from the another media content source to cohesively present the different portions of the media content to the user.

13. The client device of claim 8, wherein each media content source, of the plurality of distinct media content sources, is sequentially identified, in accordance with the priority, as the media program is being rewound.

14. The client device of claim 8, wherein:
the plurality of distinct media content sources includes a local DVR capability of the client device,
the client device is located at a user premises,
the network is external to the user premises, and
the DVR server is part of the network.

15. A non-transitory computer-readable medium to cause one or more processors to execute processor-executable instructions, wherein the processor-executable instructions cause the one or more processors to:
receive a media program provided to the client device from a media content server via a network to which the client device is connected;
receive, from a user, a request to playback media content corresponding to the media program, the request to playback the media content including a request for the client device to begin rewinding the media program being provided to the client device;
identify, based on how much of the media program is rewound, a plurality of distinct media content sources for obtaining different portions, of a plurality of portions, of the media content provided from the media content server, the plurality of distinct media content sources including:
a Digital Video Recorder (DVR) server that includes a first portion, of the plurality of portions, of the media content;
a catch up server that includes the first portion and a second portion, of the plurality of portions, of the media content; and
a video-on-demand (VoD) server that includes the first portion, the second portion, and the third portion, of the plurality of portions, of the media content;
obtain the different portions of the media content from the plurality of distinct media content sources; and
present the media content to the user.

16. The non-transitory computer-readable medium of claim 15, wherein each media content source, of the plurality of distinct media content sources, corresponds to a different type of media content source.

17. The non-transitory computer-readable medium of claim 16, wherein the first portion, the second portion, and the third portion, of the plurality of portions, of the media content are obtained from the DVR server, the catch up server, and the VoD server in accordance with a preselected priority of media content source types.

18. The non-transitory computer-readable medium of claim 15,
to identify the plurality of distinct media content sources, the processor-executable instructions cause the processor to:
identify a gap in a portion of the media content recorded by a particular media content source of the plurality of distinct media content sources, and
identify another media content source, of the plurality of distinct media content sources, capable of providing media content to fill the gap, and
to obtain the different portions of the media content, the processor-executable instructions cause the processor to:
obtain the media content with the gap from the particular media content source, and
obtain the media content to fill the gap from the another media content source.

19. The non-transitory computer-readable medium of claim 18, wherein, to present the media content to the user, the processor-executable instructions cause the processor to:
combine the media content from the media content source with the media content from the another media content source to cohesively present the different portions of the media content to the user.

20. The non-transitory computer-readable medium of claim 15, wherein each media content source, of the plurality of distinct media content sources, is sequentially identified, in accordance with the priority, as the media program is being rewound.

* * * * *